Jan. 14, 1947.   G. H. GILL   2,414,296
ANTI-ICING CONTROL FOR ENGINE SYSTEMS
Filed Oct. 13, 1943   2 Sheets-Sheet 1

Inventor
George Herbert Gill.
By
Attorney

Patented Jan. 14, 1947

2,414,296

UNITED STATES PATENT OFFICE 2,414,296

ANTI-ICING CONTROL FOR ENGINE SYSTEMS

George Herbert Gill, Los Angeles, Calif., assignor to The Garrett Corporation, Airesearch Manufacturing Company division, Los Angeles, Calif., a corporation of California Application October 13, 1943, Serial No. 506,061

11 Claims. (Cl. 123—122)

My invention relates to means for preventing the formation of ice in the intake manifolds of internal combustion engines such as employed in aircraft, and relates to a simple method whereby formation of ice in the intake manifold may be controlled and greater efficiency may be obtained from the engine.

At the present time in order to prevent formation of ice in the intake manifold at a point just following the fuel nozzles of the carburetor, the intake air temperature of many engines is maintained at a temperature of 90° F. to 100° F. The expansion and vaporization of the gasoline utilizes heat, and this heat is absorbed from the intake air so as to cause a marked reduction in its temperature. For example, this reduction in temperature is found in many instances to be about 40° F. It is therefore necessary to maintain the temperature of the intake air at such high value that the temperature of the resulting gas and air mixture will be above the value at which ice is formed when sufficient quantities of moisture are present in the intake air. These customarily employed temperatures, however, are higher than those at which maximum efficiency of operation of the engine is obtained. It is an object of my present invention to provide a fuel system for engines wherein the temperature of the intake air may be lowered to approximately 60° F., to give increased efficiency of operation, without danger to the operation of the engine resulting from the formation of ice in the intake passage when the air drawn in through the intake contains a moisture content sufficient to produce ice at the temperature caused by the expansion and vaporization of the fluid fuel which is mixed with the air.

It is an object of the invention to provide a fuel intake system for an internal combustion engine having means for feeding air into the carburetor at a controlled temperature near to the temperature which will result, after combination with the fluid fuel which is added to the air by a carburetor, in a temperature near freezing point, and means for adding heat when a freezing temperature is produced in the zone in the intake passage just following the fluid fuel inlet openings of the carburetor, thereby making it possible to employ minimum temperatures in the intake air and the air-fuel mixture, so that maximum efficiency related to fuel temperature may be obtained.

A further object of the invention is to provide a fuel intake system for an internal combustion engine having means for delivering air into the carburetor of the intake system at a controlled value, and having means which operates in response to the formation of ice in the intake passage to add heat for the purpose of stopping the formation of ice or reduce the quantity of ice formed so that the intake passage will not become clogged.

A further object of the invention is to provide a method of fueling an engine wherein air is delivered to the fluid fuel feeding means at a temperature close to that at which formation of ice is induced when the moisture content of the air is sufficiently high, and continuously observing a zone in the intake passage downstream from the fuel feeding means to note whether or not ice has formed, and adding heat when ice is so formed or when a temperature conducive to the formation of ice is produced, whereby the accumulation in the intake manifold of sufficient ice to interfere with the operation of the engine will be prevented.

Further objects and advantages of the invention will be brought out in the following part of the specification.

Referring to the drawings which are for illustrative purposes only.

Figure 1:
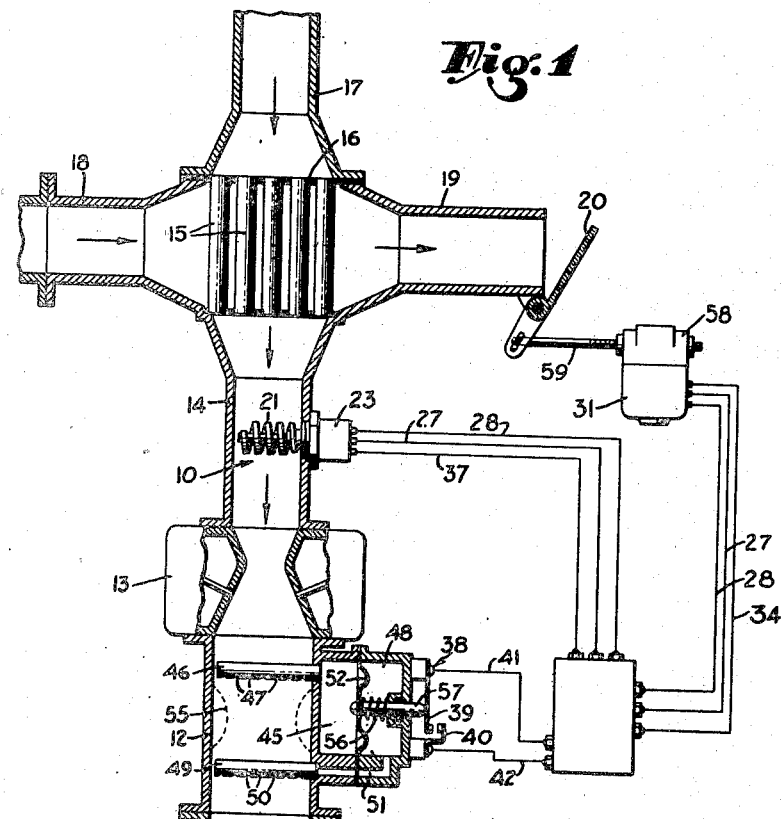
Fig. 1 is a schematic sectional view showing a preferred form of my invention.

In Fig. 1 I show an intake passage 10 formed by a tubular member 11 which is connected to the intake manifold of the engine, not shown, a tubular adaptor 12, a carburetor unit 13, an air inlet pipe 14 which is connected to the carburetor, the air passages 15 of a heat exchanger 16, and an air induction pipe 17. Air heated by the exhaust from the engine is delivered to the heat exchanger 16 by means of a pipe 18 so that it will pass through the heat exchanger 16 in cross flow relation to the air, to an outlet pipe 19 provided with a valve 20 which controls the flow of heated air through the heat exchanger 16.

Figure 2:
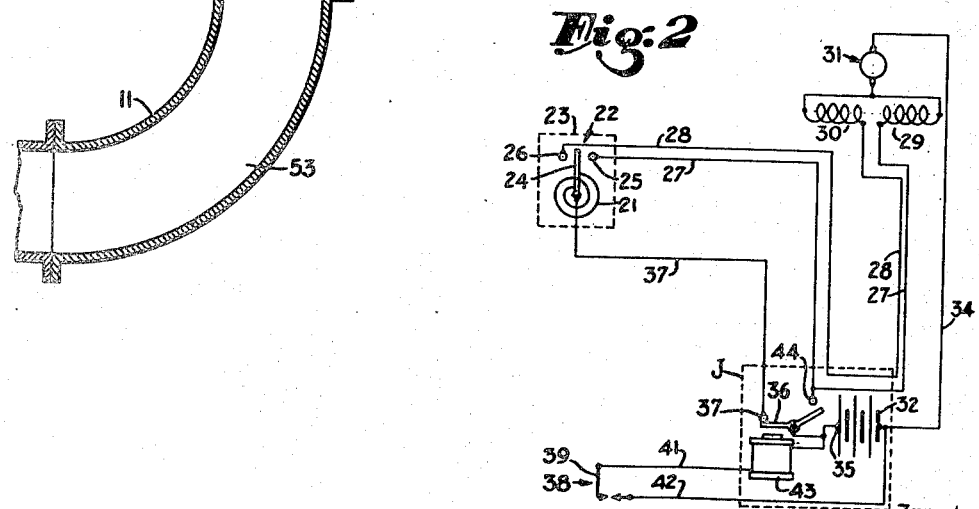
Fig. 2 is an electrical diagram showing the means whereby control of the device is attained.

In the air inlet pipe 14 between the heat exchanger 16 and the carburetor 13 there is a thermostat 21 of coiled type for operating switch means 22, Fig. 2, disposed within a switch box 23. The switch means 22 comprises a movable contact 24 which is moved by the bimetallic thermostat 21, in response to a reduction in its temperature, into engagement with the contact 25, and in response to an increase in temperature into engagement with the contact 26. The contact 25 is connected by means of a conductor 27 which extends through a junction box J to the winding 29 of a reversible motor 31, and the contact 26 is connected through a conductor 28, which also extends through the junction box J, to the winding 30 of the motor 31. In the junction box J there is a source of electrical energy represented by a battery 32 having a terminal connected by a conductor 34 with the motor 31. The opposite terminal 35 of the battery 32 is connected through a movable switch member 36 with a conductor 37 which extends to the movable contact 24 of the switch means 22.

The tubular adaptor 12 has thereon switch means 38 comprising a movable part 39 and a stationary part 40, connected in series by conductors 41 and 42 with a solenoid 43 and the battery 32. When the switch 38 is closed, the energization of the solenoid 43 will swing the movable switch part 36 out of electrical communication with the conductor 35 and into engagement with a contact 44 which is connected to the conductor 27, as shown in Fig. 2. Associated with that part of the intake-passage contained within the member 12 and the switch 38, there is means for closing the switch 38 in response to temperatures at or near freezing point. This means comprises a chamber 45 which is connected to the interior of the member 12 by means of a tube 46 having openings 47 along its lower side, and a chamber 48 connected to the interior of the member 12 at a point below the member 46 by means of a tube 49 having openings 50 along its lower side, this connection being completed by a small passage 51. Between the chambers 45 and 48 there is a movable wall, preferably consisting of a flexible diaphragm 52.

When there is a flow through the intake passage 10, as indicated by the arrows 53, during normal operation of the device, the suction produced at the openings 47 and 50 will be substantially balanced so that the pressures in the chambers 45 and 48 will be substantially equalized. The tubes 46 and 49, with their respective orifices, are disposed above and below the center of the zone in which ice accumulates during the existence of icing conditions, comprehended by the present invention. For example, by dotted lines 55 I have indicated accumulations of ice on the interior surface of the member 12. When a condition of this character is created the suction exerted through the openings 50 of the tube 49 will be greater than the suction exerted through the openings 47 of the tube 46 so that there will be a pressure differential between the chambers 45 and 48, this pressure differential, or pressure drop, moving the diaphragm 52 rightward against the action of a spring 56. When the pressure differential becomes sufficiently great, a stem 57, which extends rightward from the diaphragm 52, will move the switch member 39 into contact with the switch member 40, thereby closing the circuit through the solenoid 43.

The operation of the preferred form of the invention may be explained as follows: The thermostat 21 is calibrated and adjusted so that the movable switch contact 24 will be maintained in an intermediate position between the contacts 25 and 26 at a predetermined temperature for the intake air—for example 60°. The inflowing air is receiving heat from the heat exchanger 16, and should there be an increase in the temperature of the air which comes into contact with the thermostat 21, the contact 24 will be moved into engagement with the contact 26 to energize the motor winding 30 through the conductor 28 so that the motor will then act through a reduction gear 58 and a linkage 59 to swing the valve 20 toward closed position, thereby reducing the flow of engine-heated air through the passages 18 and 19, and thereby decreasing the transfer of heat from the tube walls of the heat exchanger 16 to the air flowing through the intake passage 10. The purpose of this controlling action is to bring the temperature of the intake air back to the normal value for which the thermostat 21 has been set. A cooling of the air brought into contact with the thermostat 21 will cause movement of the contact 24 into engagement with the contact 25 so that current will flow through the conductor 27 and through the winding 29 of the motor 31 to produce an opening movement of the valve 20 so that there will be an increased flow of engine-heated air through the heat exchanger 16, for the purpose of adding heat to the intake air which passes downward through the heat exchanger 16. In the foregoing manner the control system tends to maintain a substantially constant temperature in the air which flows through the intake to the carburetor 13.

The carburetor 13 adds fluid fuel, generally gasoline, to the air flow and in the zone immediately following the carburetor 13, there is a marked reduction in temperature due to the expansion and vaporization of the fuel, the result being that in the adaptor 12 a temperature near or below freezing may exist. For example, the device may be operated under conditions of air intake temperature which will produce in the zone following the carburetor a temperature ranging between 10° F. and 32° F. When the air which passes through the intake is moist, there will be an accumulation of ice within the adaptor 12, which formation of ice has been previously dangerous to the operation of the internal combustion engine. But in my invention when the formation of ice reaches a predetermined stage characteristic to the construction of the control, the pressure differential acting rightward between the chambers 45 and 48 will move the diaphragm 52 rightward so as to close the switch 38. Energization of the solenoid 43, resulting from the closing of the switch 38, will swing the movable switch member 36 in counterclockwise direction so that it will engage the contact 44 and disengage the contact 37', so that the thermostat 21 will be relieved of its controlling action and current will flow directly from the battery 32 through the conductor 27 and the motor winding 29, to move the valve 20 toward open position, thereby increasing the heat content of the air which flows through the intake passage and negative the ice forming condition existing in or adjacent the outlet of the carburetor 13. This addition of heat will cause a melting of at least a portion of the ice which has formed so that the rightward pressure differential acting against the diaphragm 52 will be lessened so as to open the switch 38, whereupon the thermostatic control will take over.

Figure 3:
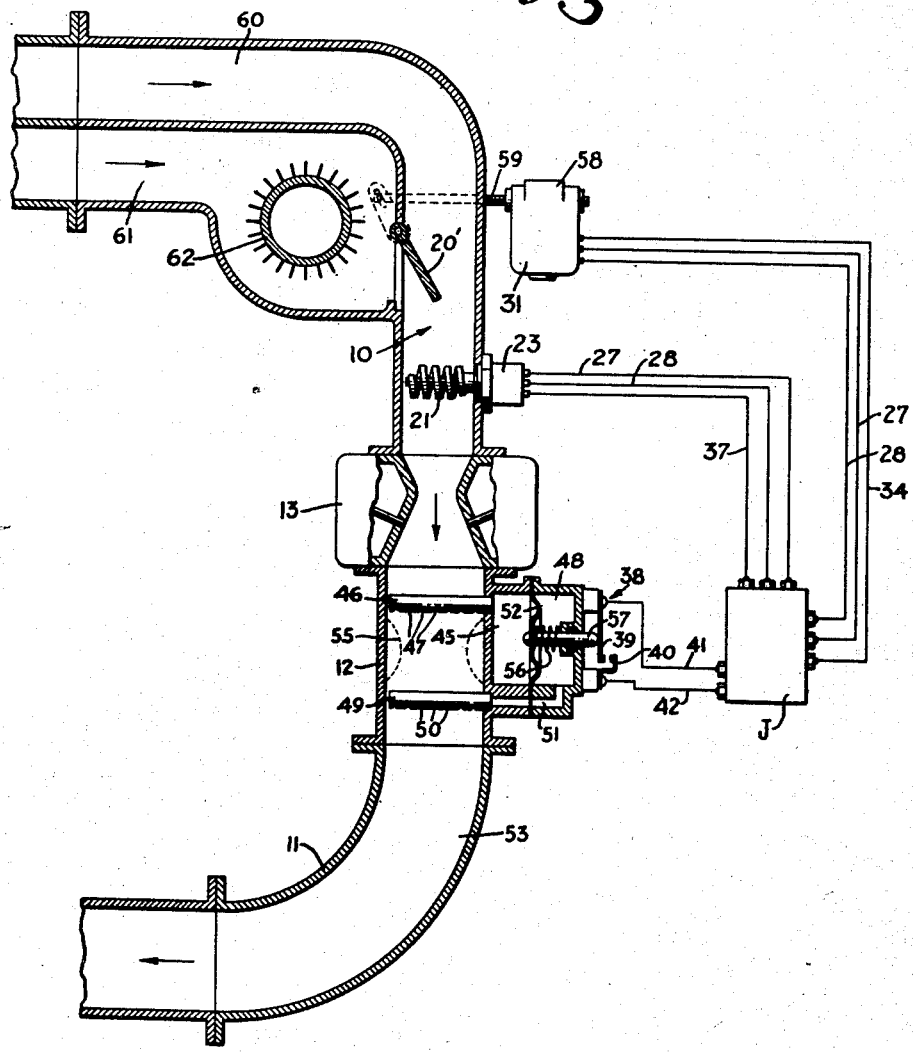
Fig. 3 is a schematic sectional view showing an alternative form of the invention.

In Fig. 3 I show a form of my invention wherein the temperature of the air which flows through the intake passage to the carburetor is controlled by the combining of streams of cold and hot air in varying quantities as necessary. In Fig. 3 many of the parts of Fig. 1 have been duplicated and the same numbers have been applied thereto. As hereinbefore indicated, the difference of Fig. 3 from Fig. 1 is that there are two primary air intake passages 60 and 61 which lead into the intake passage 10. The primary passage 60 is the cold air inlet, and the primary inlet passage 61 is the hot air inlet passage. It includes a source of heat ordinarily consisting of a portion of the exhaust pipe 62 through which the exhaust products pass from the engine. The valve or gate 25 is movable in a position to vary the flows of air through the passages 60 and 61, and the motor 31 and its transmission means comprising the parts 58 and 59 swing the member in accordance with the requirements of the thermostat control.

For example, if the air which contacts the thermostat 21 rises above or falls below the predetermined value for which the control is set, the member 20 will be moved either leftward or rightward respectively. When ice accumulates in the adaptor 12 the switch means 38 will be closed and the control will operate to swing the member 20' rightward, thereby increasing the flow of air through the passage 61 and decreasing the flow through the passage 60, so that the heat content of the air which passes through the intake 10 will be raised to offset the icing condition.

I claim as my invention:

1. In a fuel system for an internal combustion engine having an air intake duct and means for feeding a fluid fuel into said duct, the combination of: means operating automatically in response to changes in temperature of the air to vary the temperature of the air which passes through said duct into said fuel feeding means so that the temperature of the air will be normally maintained near a prescribed value; and means connected to said duct at a point downstream from said fuel feeding means and responding to changes in temperature in said duct resulting from the formation of ice in said duct between said fuel feeding means and said engine, for increasing the temperature of the zone in which the ice has formed so as to melt the ice.

2. In a fuel system for an internal combustion engine having an air intake duct and means for feeding a fluid fuel into said duct, the combination of: thermo-responsive means operating automatically to vary the temperature of the air which passes through said duct into said fuel feeding means so that the temperature of the air will be normally maintained near a prescribed value; and control means connected to said duct at a point downstream from said fuel feeding means, said control means dominating said thermo-responsive means and being adapted, in response to an increase in pressure drop between spaced points in said duct resulting from the formation of ice therein, to increase the temperature of the zone in which the ice has formed so as to melt the ice.

3. In a fuel system for an internal combustion engine having an air intake duct and means for feeding a fluid fuel into said duct, the combination of: thermo-responsive means operating automatically to vary the temperature of the air which passes through said duct into said fuel feeding means so that the temperature of the air will be normally maintained near a prescribed value said first named means comprising heating means for adding heat to the air which passes through said duct to said fuel feeding means, said heating means having means for controlling the action thereof comprising a movable control part disposed adjacent said duct downstream from said fuel feeding means; and responsive means connected to the interior of said duct in a region downstream of said fuel feeding means, dominating said thermo-responsive means and operative in response to a decrease in temperature in said region below a prescribed value to move said control part of said control means whereby said heating means will act to add heat to the air and the temperature of the zone inside said duct downstream from said fuel feeding means will be raised so as to negative accumulation of ice therein.

4. In a fuel system for an internal combustion engine having an air intake duct and means for feeding a fluid fuel into said duct, the combination of: thermo-responsive means operating automatically to vary the temperature of the air which passes through said duct into said fuel feeding means so that the temperature of the air will be normally maintained near a prescribed value, said first named means comprising heating means for adding heat to the air which passes through said duct to said fuel feeding means, said heating means having means for controlling the action thereof comprising a movable control part disposed adjacent said duct downstream from said fuel feeding means; and responsive means connected to the interior of said duct downstream of said fuel feeding means operative in responsive to the formation of ice in said duct in a zone downstream of said fuel feeding means and independently of said thermo-responsive means to move said control part of said control means whereby said heating means will act to add heat to the air and the temperature of the zone inside said duct downstream from said fuel feeding means will be raised so as to negative accumulation of ice therein, said responsive means comprising a pair of chambers, a movable wall between said chambers, passage means connecting the interior of said duct above the said zone in which ice forms to one of said chambers, passage means connecting the interior of said duct below said zone in which ice forms to the other of said chambers, and means to transmit movement from said movable wall to said control part.

5. In a fuel system for an internal combustion engine having an air intake duct and means for feeding a fluid fuel into said duct, the combination of: thermo-responsive means operating automatically to vary the temperature of the air which passes through said duct into said fuel feeding means so that the temperature of the air will be normally maintained near a prescribed value, said first named means comprising heating means for adding heat to the air which passes through said duct to said fuel feeding means, said heating means having means for controlling the action thereof comprising a movable control part disposed adjacent said duct downstream from said fuel feeding means; and responsive means connected to the interior of said duct downstream of said fuel feeding means operative in responsive to the formation of ice in said duct in a zone downstream of said fuel feeding means and independently of said thermo-responsive means to move said control part of said control means whereby said heating means will act to add heat to the air and the temperature of the zone inside said duct downstream from said fuel feeding means will be raised so as to negative accumulation of ice therein, said responsive means comprising a pair of chambers, a movable wall between said chambers, tubular means extending into said duct above the said zone in which ice forms and having an opening in its lower side connected to one of said chambers, tubular means extending into said duct below said zone in which ice forms and having an opening in its lower side connected to the other of said chambers, and means to transmit movement from said movable wall to said control part.

6. In a fuel system for an internal combustion engine having an air intake duct and means for feeding a fluid fuel into said duct, the combination of: thermo-responsive means operating automatically to vary the temperature of the air which passes through said duct into said fuel feeding means so that the temperature of the air will be normally maintained near a prescribed value, said first named means comprising heating means for adding heat to the air which passes through said duct to said fuel feeding means, said heating means having means for controlling the action thereof comprising a movable control part disposed adjacent said duct downstream from said fuel feeding means; and responsive means connected to the interior of said duct downstream of said fuel feeding means operative in responsive to the formation of ice in said duct in a zone downstream of said fuel feeding means independently of said thermo-responsive means to move said control part of said control means whereby said heating means will act to add heat to the air and the temperature of the zone inside said duct downstream from said fuel feeding means will be raised so as to negative accumulation of ice therein, said responsive means comprising a pair of chambers, a movable wall between said chambers, tubular means extending into said duct above said zone in which ice forms and having an opening in its lower side connected to one of said chambers, passage means connecting the interior of said duct below said zone in which ice forms to the interior of the other of said chambers, and means to transmit movement from said movable wall to said control part.

7. In a fuel system for an internal combustion engine having an air intake duct and means for feeding a fluid fuel into said duct, the combination of: means operating automatically to vary the temperature of the air which passes through said duct into said fuel feeding means so that the temperature of the air will be normally maintained near a prescribed value, said means having a valve which moves toward a first position to increase the heat content of the air and toward a second position to decrease the heat content of the air, a thermostat exposed to the flow of air, and motor means acting in response to changes in the temperature above and below a prescribed value of said thermostat to move said valve; supplementary control means operable to override the controlling action of said thermostat and cause said motor means to move said valve toward said first position; and responsive means connected to said duct below said fuel feeding means, adapted to respond to a condition contributing to the formation of ice to operate said supplementary control means whereby the heat content of the air will be increased to offset said condition in said duct below said fuel feeding means.

8. In a fuel system for an internal combustion engine having an air intake duct and means for feeding a fluid fuel into said duct, the combination of: means operating automatically to vary the temperature of the air which passes through said duct into said fuel feeding means so that the temperature of the air will be normally maintained near a prescribed value, said means having a valve which moves toward a first position to increase the heat content of the air and toward a second position to decrease the heat content of the air, a thermostat exposed to the flow of air, and motor means acting in response to changes in the temperature above and below a prescribed value of said thermostat to move said valve; supplementary control means operable to override the controlling action of said thermostat and cause said motor means to move said valve toward said first position; and responsive means connected to said duct below said fuel feeding means, adapted to respond to changes in pressure resulting from the formation of ice in said duct to operate said supplementary control means whereby the heat content of the air will be increased to offset said condition in said duct below said fuel feeding means.

9. A method of fueling an internal combustion engine having a fuel intake passage, feeding a fluid fuel into said passage, feeding air into said passage to mix with said fuel and normally controlling the heat content of the air flowing through said passage in response to changes in temperature in said air whereby to maintain said air at a temperature close to that at which formation of ice is induced when moist air is brought into proximity to the expanding fluid fuel, observing whether ice forms in said intake, and independently of the aforesaid normal heat content control, raising the temperature in the zone in which ice forms in response to such ice formation so as to melt the ice before it can harmfully obstruct the flow through said intake.

10. In a fuel system for an internal combustion engine having an air intake duct and means for feeding a fluid fuel into said duct, the combination of: means operating automatically in response to changes in temperature of the air to vary the temperature of the air which passes through said duct into said fuel feeding means so that the temperature of the air will be normally maintained near a prescribed value; and means connected with said duct and responding to a condition wherein ice forms in the duct to override the controlling action of said first named means and increase the temperature in the duct to one above which ice will form.

11. In a fuel system for an internal combustion engine having an air intake duct and means for feeding a fluid fuel into said duct, the combination of: means operating automatically in response to changes in temperature of the air to vary the temperature of the air which passes through said duct into said fuel feeding means so that the temperature of the air will be normally maintained near a prescribed value; and means connected with said duct and responding to a condition wherein ice forms in the duct to override the controlling action of said first named means and increase the temperature in the duct which is capable of melting ice.

GEORGE HERBERT GILL.

Certificate of Correction

Patent No. 2,414,296. January 14, 1947.

GEORGE HERBERT GILL

It is hereby certified that errors appear in the printed specification of the above numbered patent requiring correction as follows: Column 7, line 20, claim 6, for "responsive" read *response*; line 22, after "means" insert *and*; and that the said Letters Patent should be read with these corrections therein that the same may conform to the record of the case in the Patent Office.

Signed and sealed this 15th day of April, A. D. 1947.

[SEAL]

LESLIE FRAZER,
*First Assistant Commissioner of Patents.*